United States Patent
Wuestefeld et al.

(10) Patent No.: US 6,737,970 B2
(45) Date of Patent: May 18, 2004

(54) OPTO-ELECTRONIC APPARATUS FOR MONITORING AND DETECTION OF INTRUSION OF AN OBJECT

(75) Inventors: Martin Wuestefeld, Sexau (DE); Georg Plasberg, Balingen (DE); Heiner Juers, Waldkirch (DE); Gehard Mutter, Ibach (DE)

(73) Assignee: Sick AG, Waldkirch/Breisgau (DE)

( * ) Notice: Subject to any disclaimer, the term of this patent is extended or adjusted under 35 U.S.C. 154(b) by 314 days.

(21) Appl. No.: 09/866,545

(22) Filed: May 25, 2001

(65) Prior Publication Data

US 2002/0070860 A1 Jun. 13, 2002

(30) Foreign Application Priority Data

May 26, 2000 (DE) .......................... 100 26 305

(51) Int. Cl.[7] .................. G08B 13/00; G08B 73/18; H04N 9/47; H04N 7/18; G06K 9/00; G06K 9/62
(52) U.S. Cl. .................. 340/552; 340/541; 340/555; 340/556; 340/567; 340/568.1; 348/143; 348/152; 348/161; 382/181; 382/224
(58) Field of Search .................. 340/541, 555, 340/556, 557, 565, 567, 552, 568.1; 348/152, 135, 161, 143, 61; 250/221, 222.1; 382/181, 224

(56) References Cited

U.S. PATENT DOCUMENTS 4,804,860 A * 2/1989 Ross et al. .................. 307/117
5,117,221 A * 5/1992 Mishica, Jr. .................. 340/556
5,410,149 A 4/1995 Winston .................. 250/221
6,075,238 A * 6/2000 Fembok .................. 250/221

FOREIGN PATENT DOCUMENTS

| DE | G9114867.7 | 3/1992 |
|---|---|---|
| DE | 4233810 A1 | 4/1994 |
| DE | 4424537 A1 | 1/1996 |
| DE | 29602098 U1 | 5/1996 |
| DE | 19730341 A1 | 1/1999 |
| DE | 19809709 A1 | 9/1999 |
| DE | 19522760 C2 | 12/1999 |
| DE | 29920715 U1 | 3/2000 |
| DE | 10003691 A1 | 8/2000 |

* cited by examiner

Primary Examiner—Brent A. Swarthout
Assistant Examiner—Lam Pham
(74) Attorney, Agent, or Firm—Townsend and Townsend and Crew, LLP

(57) ABSTRACT

An opto-electronic apparatus for the monitoring of a protection area which has at least one protection device, which works in a non-contact manner, is described. The protection device, which works in a non-contact manner, has an evaluation unit for the generation of an object detection signal on the intrusion of an object into the protection area. An image detection unit is coupled to the protection device, which works in a non-contact manner, for the detection of an areal or spatial image detection area, with a secondary monitoring area disposed close to the protection area, but outside the protection area, being detected by the image detection unit. The protection device, which works in a non-contact manner, is controllable by the image detection unit.

20 Claims, 5 Drawing Sheets

OPTO-ELECTRONIC APPARATUS FOR MONITORING AND DETECTION OF INTRUSION OF AN OBJECT

BACKGROUND OF THE INVENTION

The present invention relates to an opto-electronic apparatus for the monitoring of a protection area having at least one protection device which works in a non-contact manner and which comprises an evaluation unit for the generation of an object detection signal on the intrusion of an object into the protection area.

Opto-electronic apparatuses of this kind are used, for example, to secure dangerous machinery, in particular to prevent the intrusion of persons into the operating area of the machinery. The protection device, which works in a non-contact manner, can, for example, be formed as a light barrier, a light grid or a light scanner arranged at a sufficient distance in front of the machine to be secured.

If an object intrudes into the protection area of the protection device, which works in a non-contact manner, so that, for example, at least one light ray is interrupted, then an object detection signal is generated by which the machine is normally shut down and an alarm signal triggered.

The protection device, which works in a non-contact manner, can also be formed as an image detection unit for the detection of an areal or spatial image detection area. Such an image detection unit can be formed, for example, as a camera system, with the image detection area being either passively or actively illuminated. An illumination unit or system can in particular be provided with which a complex light pattern can be generated within the image detection area. This pattern can be detected by the image detection unit and compared with a corresponding reference pattern. If the detected pattern and the pre-set complex patter differ from one another, then the object detection signal is generated. The invention is also directed to an opto-electronic apparatus comprising such a protection device, which works in a non-contact manner and is formed as an image detection unit.

Within the meaning of the present application, the term light is to be understood as any optical radiation, that is, for example, infra-red radiation, visible light and UV radiation. Accordingly, the elements mentioned in this application which transmit and receive light are each suitable for the transmission and reception respectively of light of the frequency used.

It is frequently desirable for opto-electronic apparatuses of the kind initially mentioned to take over further additional functions in addition to their protection function. One additional function, for example, is termed "muting". Muting is understood to be the short-term deactivation of the protection device, which works in a non-contact manner, which is required, for example, when objects recognized as permitted are intended to intrude into the protection area without generating an object detection signal. For example, objects of certain pre-set dimensions on a conveyor belt should be able to pass through the protection area without hindrance, while persons or non-permitted objects should trigger an object detection signal on intruding into the protection area.

A corresponding control of the protection device, which works in a non-contact manner, can be effected, for example, by light barriers connected in front of the protection area in the transport direction of the objects. These light barriers are, however, relatively limited in the recognition of permitted objects.

SUMMARY OF THE INVENTION

It is an object of the present invention to form an opto-electronic apparatus of the kind initially mentioned such that further additional functions can be realized in addition to the protection function in a very flexible manner.

Starting from an opto-electronic apparatus of the kind initially mentioned, this object is satisfied in accordance with the invention by an image detection unit being coupled to the protection device, which works in a non-contact manner, for the detection of an areal or spatial image detection area and which can be used to detect a secondary monitoring region disposed close to the protection area, but outside the protection area, and by the protection device, which works in a non-contact manner, being controllable by the image detection unit.

If the protection device, which works in a non-contact manner, comprises an image detection unit for the detection of an areal or spatial image detection area, then the object is also satisfied in accordance with the invention by an opto-electronic apparatus of the initially named kind in which only a part of the image detection area forms the protection area and the remaining part of the image detection area forms a secondary monitoring area, at least in part, and the evaluation unit is formed for the separate evaluation of the detected protection area and of the detected secondary monitoring area.

Both ways of satisfying the object in accordance with the invention share the feature that a secondary monitoring area is provided which is separate from the protection area and which can be detected by an image detection unit and thus be monitored. A very flexible monitoring of the secondary monitoring area is possible as a result of the monitoring of the secondary monitoring area by means of an image detection unit. Objects intruding into the secondary monitoring area can, for example, be classified by their size, their color, their shape, their speed or by other criteria.

One and the same objects, which sequentially pass through the secondary monitoring area and the protection area, can thus be uniformly monitored in each case and tracked in their movement as a result of the invention.

In accordance with an advantageous embodiment of the invention, the protection function of the protection device, which works in a non-contact manner, can be deactivated at least regionally and/or for a time on the detection of an object with pre-set characteristic features within the secondary monitoring area. A muting function can be realized in this manner, wherein permitted objects can be distinguished from non-permitted objects very flexibly and reliably by the use of an image detection unit.

It is in particular possible to carry out a classification of objects intruding into the secondary monitoring area by the image detection unit. The classification can, for example, control the muting function or trigger another additional function for which a classification of the objects is required prior to the reaching of the protection area.

Furthermore, a quality control of objects intruding into the secondary monitoring area can be carried out by the image detection unit.

The protection device, which works in a non-contact manner, preferably comprises at least one transmitter unit emitting light signals and at least one receiver unit receiving the emitted light signals either directly or indirectly, with the protection area being defined by the signal path of the emitted light signals. The protection device, which works in a non-contact manner, can be formed, for example, as a camera system, in particular with an active illumination unit. In this case, the transmitter unit emitting light can, for example, generate a simple or a complex pattern, for example a straight line, a curved line, individual dots or other patterns within the image detection area, with the pattern generated being detected by the image detection unit. The detected pattern is then compared to a pre-set pattern by the evaluation unit, with this pre-set pattern having been generated and stored, for example, without an object in the image detection area or with a permitted object inside the detection area. If the detected pattern and the pre-set pattern are substantially the same, then no object detection signal is generated. Monitoring of both the plane of illumination and the detection plane is thus carried out by the apparatus in accordance with the invention, since the detected pattern formed by the light signals is changed on an interruption of both the emitted light rays and the detected reflected light rays.

The protection device, which works in a non-contact manner, can also be formed as a light grid or a light scanner, with in this case the transmitter unit emitting light preferably comprising a plurality of transmitter elements and the receiver unit preferably comprising a plurality of receiver elements. If a certain minimum number, for example one or more, of the emitted light rays is interrupted, then this is recognized by the evaluation unit connected to the receiver unit and a corresponding object detection signal is generated.

The secondary monitoring area can be presentable on a display unit, in particular on a screen. A diagnostic function is, for example, possible in addition to the protection function in this way.

The invention is described in more detail in the following by means of embodiments and with reference to the drawings.

DESCRIPTION OF THE PREFERRED EMBODIMENTS

Figure 1:
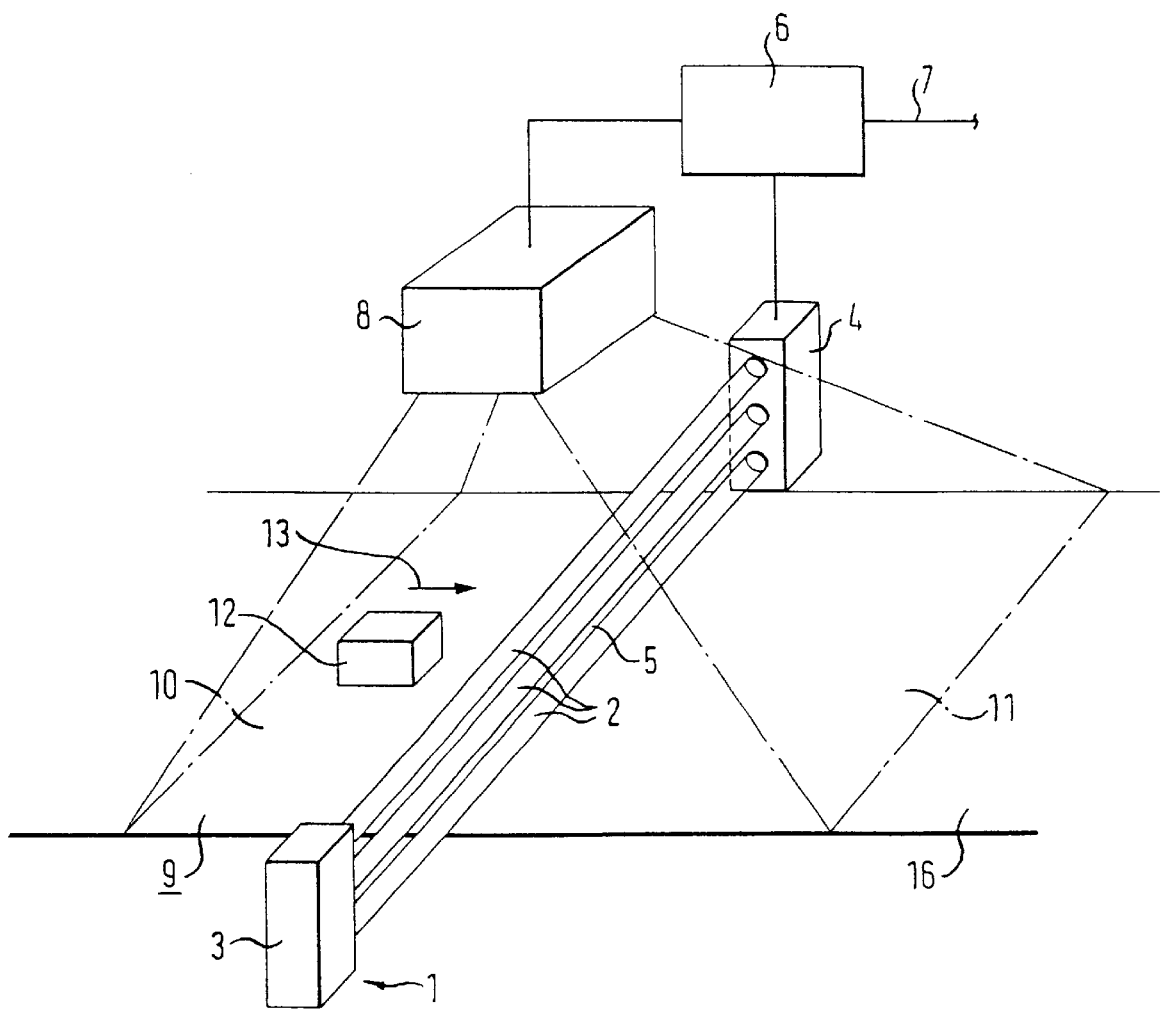
FIG. 1 shows a first embodiment of the invention.

FIG. 1 shows a protection device 1, including a light grid, which works in a non-contact manner and which comprises a transmitter unit 3 emitting light rays 2, a receiver unit 4 receiving the light rays and an evaluation unit 6 connected to the receiver unit 4 so that a protection area 5 is defined by the light rays 2.

The receiver unit 4 is coupled to the evaluation unit 6 such that an object detection signal is generated by this at an output 7 on the interruption of one of the light rays 2.

The evaluation unit 6 is connected to an image detection unit 8 formed as a camera which is aligned such that its image detection area 9 covers the protection area 5. The part areas of the image detection area 9 arranged at both sides of the protection area 5 form secondary monitoring areas 10, 11 which are monitored by the image detection unit 8.

An object 12 is arranged inside the secondary monitoring area 10 which is moved, for example, on a conveyor belt 16 in the direction of an arrow 13.

When the object 12 enters into the secondary monitoring area 10, it is detected by the image detection unit 8 and classified by the evaluation unit 6. If the object 12 is recognized as a permitted object, then the protection device 1, which works in a non-contact manner, is deactivated so that when the object 12 moves further in the direction of the arrow 13, no object detection signal is generated despite the intrusion of the object 12 into the protection area 5. The deactivation can be effected, for example, by a corresponding control of the receiver unit 4 or by an appropriate evaluation logic within the evaluation unit 6.

When the object is fully detected within the secondary monitoring area 11 by the image detection unit 8 after leaving the protection area 5, then the protection device 1, which works in a non-contact manner, is activated again.

In addition to the control of the protection device 1, which works in a non-contact manner, the image of the secondary monitoring regions 10, 11 generated by the image detection unit 8 can also be used by the evaluation unit 6 for a quality assurance control of the object 12 or, for example, for material flow control.

The deactivation of the protection device 1, which works in a non-contact manner, can take place, for example, by a deactivation of the reception elements of the receiver unit 4 or by an appropriate logical link within the evaluation unit 6. If a light scanner is used, the deactivation of the protection device can also be carried out, for example, by a deactivation of the transmitter elements.

Figure 2:
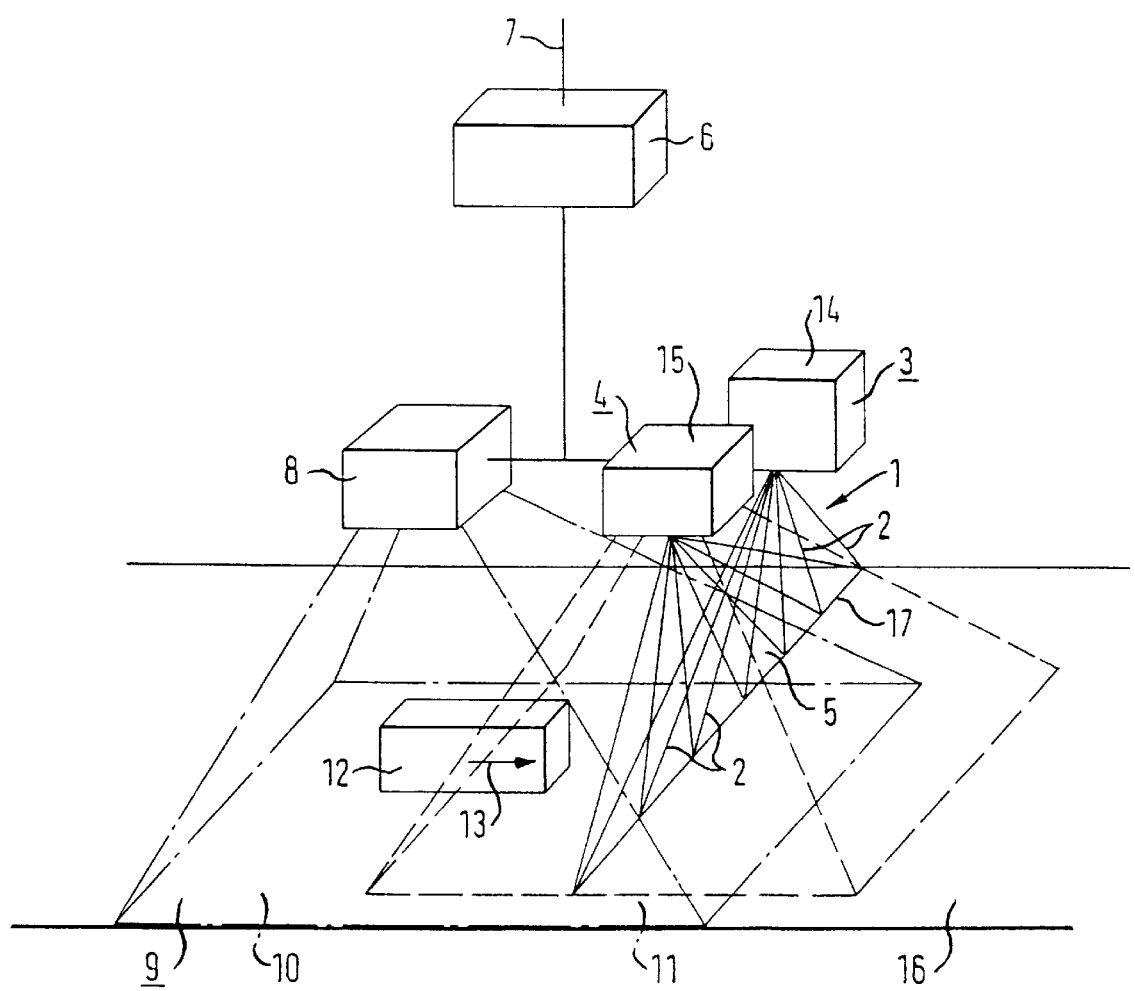
FIG. 2 shows a second embodiment of the invention.

In the embodiment shown in FIG. 2, elements which have already been shown in FIG. 1 are marked with the same reference numerals.

The embodiment in accordance with FIG. 2 differs from the embodiment of FIG. 1 in that the protection device 1, which works in a non-contact manner, does not comprise a light grid, but a transmitter unit 3 formed as an illumination unit 14 and a receiver unit 4 formed as an image detection unit 15, for example as a camera. Light rays 2 are emitted by the illumination unit 14 in the direction of the conveyor belt 16 so that a structured illumination is generated in the form of a line 17 on the conveyor belt 16.

The line 17 is detected by the image detection unit 4, with the detected image being transmitted to the evaluation unit 6. The evaluation unit 6 compares the detected image of the line 17 with a pre-set reference image which corresponds to the profile of the line 17 with an object 12 not present. If the detected image of the line 17 agrees with the reference image within a certain tolerance range, then no object detection signal is generated by the evaluation unit 6. If the detected image of the line 17, however, differs from the reference image by a pre-set threshold value, then an object detection signal is generated at the output 7 of the evaluation unit 6. This is the case when the object 12 arranged on the conveyor belt 16 is moved along the arrow 13 so far until it intrudes into the protection area 5 formed by the light rays 2.

In addition to the image detection unit 15, an image detection unit 8 is in turn provided by which an image detection area 9 is monitored which is regionally formed in front of the protection area 5 in the direction of movement of the object 12. As in FIG. 1, the image detection area 9 of the image detection unit 8 is also split into two secondary monitoring regions 10, 11, which are each arranged at different sides of the protection area 5, in FIG. 2.

If a permitted object 12 enters into the secondary monitoring region 10, then the object 12 is detected by the image detection unit 8 formed, for example, as a camera and the detected image of the object 12 is evaluated by the evaluation unit 6. The shape, the size (length, height, breadth), the color or other optically detectable properties of the object 12 are recognized, for example, and the object 12 classified as a permitted object on the basis of these characteristic features. In this case, the protection function of the protection device 1, which works in a non-contact manner, is deactivated by the evaluation unit 6 so that the permitted object 12 can pass through the protection area 5 without generating an object detection signal.

To increase the reliability of recognition, the object 12 can be measured once more while passing through the deactivated protection area 5 while using the structured illumination generated by the illumination unit 14. Furthermore, if required, the object speed can be taken into account to increase the measuring precision of the size of the object 12.

Finally, the further additional functions already described with reference to FIG. 1 can also be realized in the embodiment of FIG. 2, such as a quality assurance control or a material flow control, by an evaluation of the images of the secondary monitoring areas 10 and 11 generated by the image detection unit 8.

Figure 3:
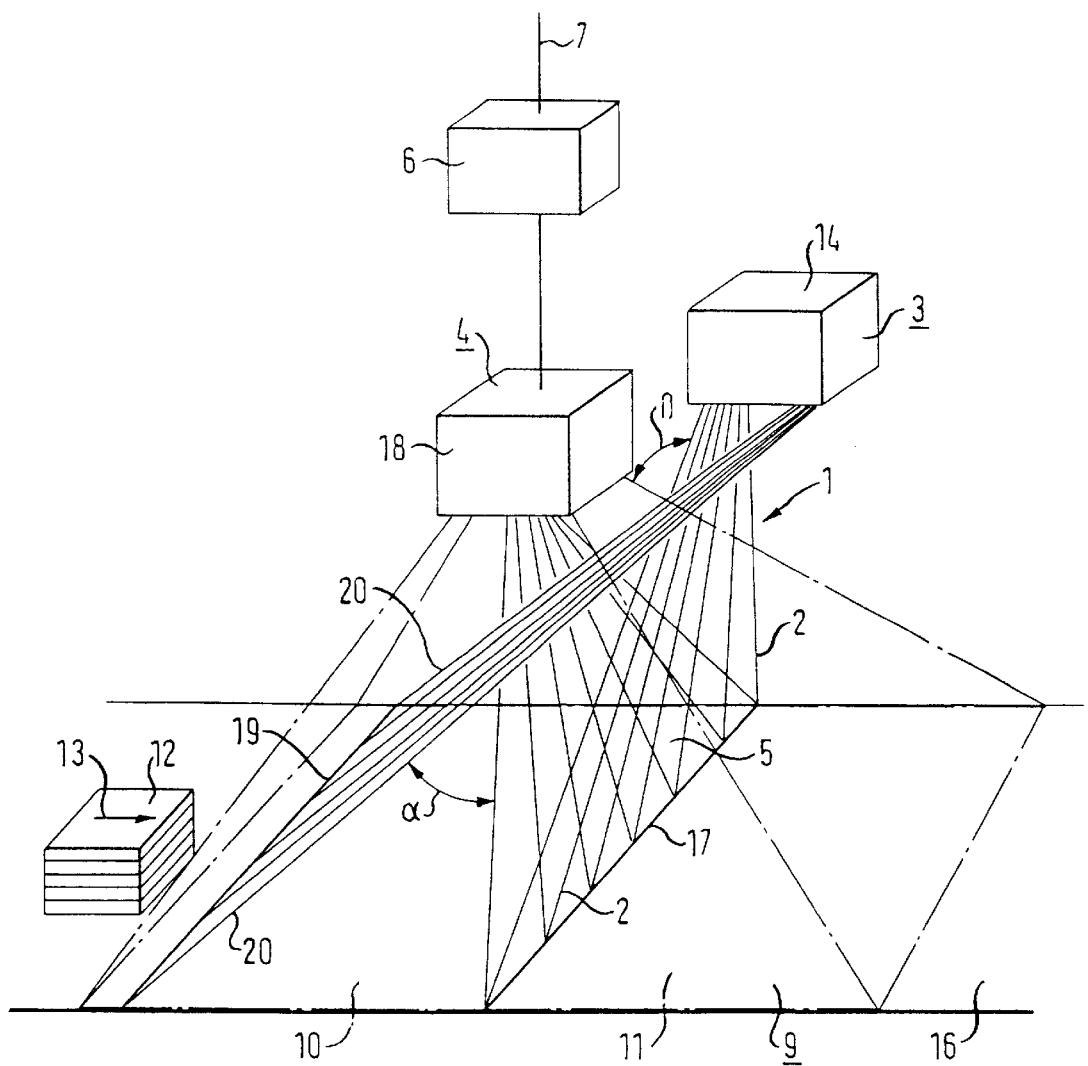
FIG. 3 shows a third embodiment of the invention.

The embodiment of FIG. 3 differs from the embodiment of FIG. 2 in that the two image detection units 4, 8 are put together to form a single image detection unit 18. Furthermore, two lines 17, 19 are projected onto the conveyor belt 16 by the illumination unit 14 and are each detected by the image detection unit 18 and evaluated by the evaluation unit 6. The lines 17, 19 can, as in all other embodiments, have either a structured form or a homogeneous form. It is only necessary that the illumination unit 14 and the image detection unit 18 are arranged at a triangulation angle such that the lines 17, 19 can be detected by the image detection unit 18. Accordingly, in FIG. 3, the triangulation angle between the image detection unit 18 and the light rays 2 forming the line 17 is designated by β and the triangulation angle between the image detection unit 18 and the light rays 20 forming the line 19 by α.

If the object enters into the secondary monitoring area 10 such that the line 19 comes to lie at the front side of the object 12, then the line 19 is displaced upwardly on the object 12 in accordance with the movement of the object 12. The resulting displacement is a measure for the object height. Furthermore, the length of the object 12 can be determined by an evaluation of the object speed or the use of further light lines projected onto the conveyor belt 16. For this purpose, the respective light lines 19 are detected by the image detection unit 18 and appropriately evaluated by the evaluation unit 6. If a permitted object 12 is recognized, then the protection function of the protection device 1, which works in a non-contact manner, is deactivated for a time so that the permitted object 12 can pass through the protection area 5 without generating an object detection signal.

Figure 4:
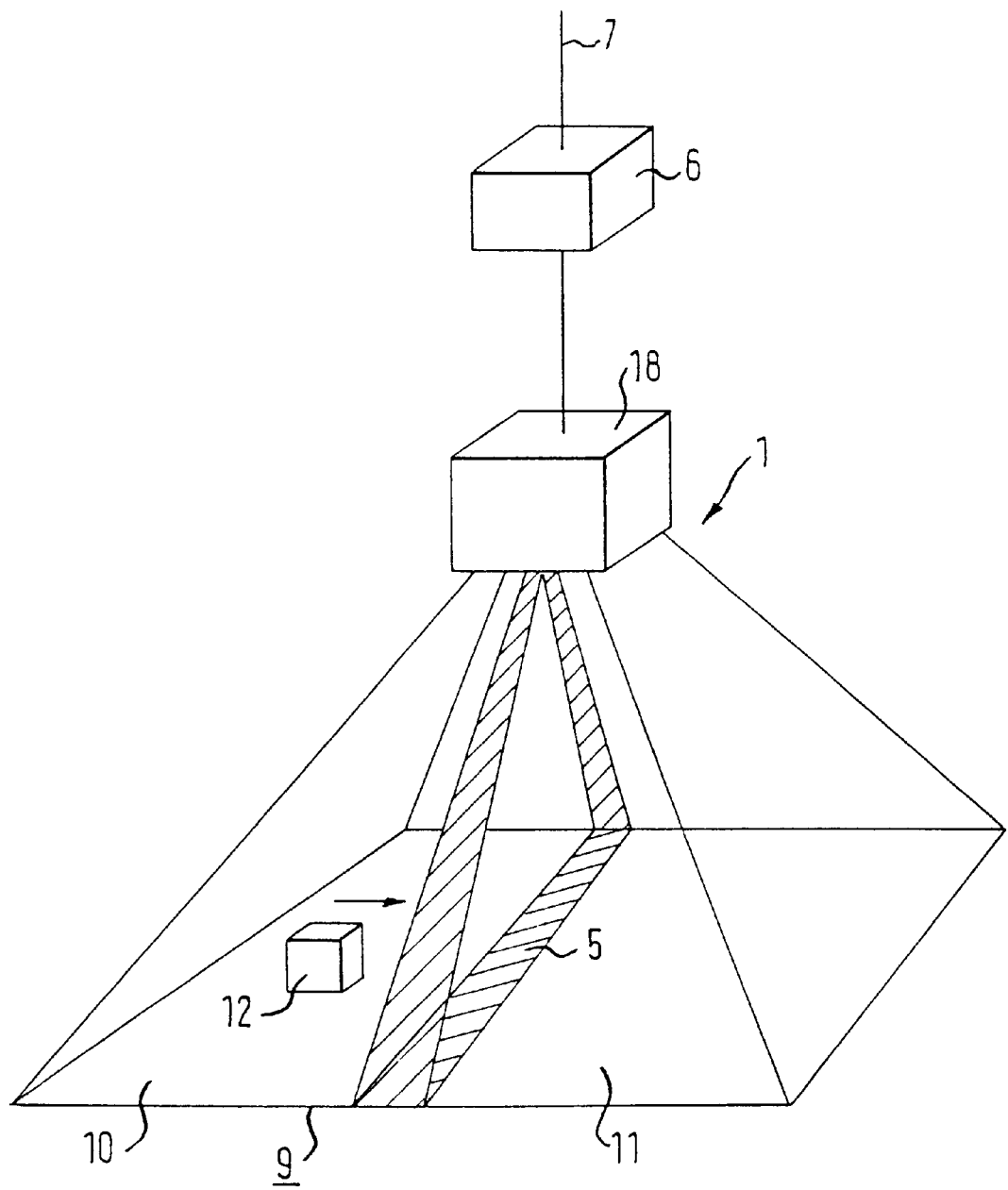
FIG. 4 shows a fourth embodiment of the invention.

In the embodiment of FIG. 4, only a part of the image detection area 9 of the image detection unit 18 is evaluated as a protection area 5 by the evaluation unit 6. The remaining part of the image detection area 9 is formed as a secondary monitoring area 10, 11.

The evaluation unit 6 is formed such that when an object 12 intrudes into the protection area 5, an object detection signal is generated at the output 7. For this purpose, the image of the protection area 5 detected by the image detection unit 18 is compared in each case with a pre-set reference image of this area by the evaluation unit 6. If the detected image of the protection area 5 differs from the pre-set image, then the object detection signal is generated.

The secondary monitoring areas 10 and 11 not required for the protection function can be evaluated separately by the evaluation unit 6. The images of the secondary monitoring areas 10, 11 are, for example, checked for the intrusion of permitted objects 12 by the evaluation unit 6 so that when a permitted object is recognized, the protection function of the protection device 1, which works in a non-contact manner, is deactivated for a time; that is, the evaluation unit 6 does not generate an object detection signal on the intrusion of such an object 12 recognized as permitted into the protection area 5.

In a similar manner, the evaluation unit 6 can alternatively or additionally use the images of the secondary monitoring areas 10, 11 for further additional functions such as quality control or material flow control. The image detection unit 18 can also be used for diagnosis in addition to the control or monitoring of hazardous procedures. A corresponding apparatus is shown in FIG. 5.

In the event of an infringement of the protection area 5, an object detection signal is generated by the evaluation unit 6, by which the secured machine is usually shut down.

Figure 5:
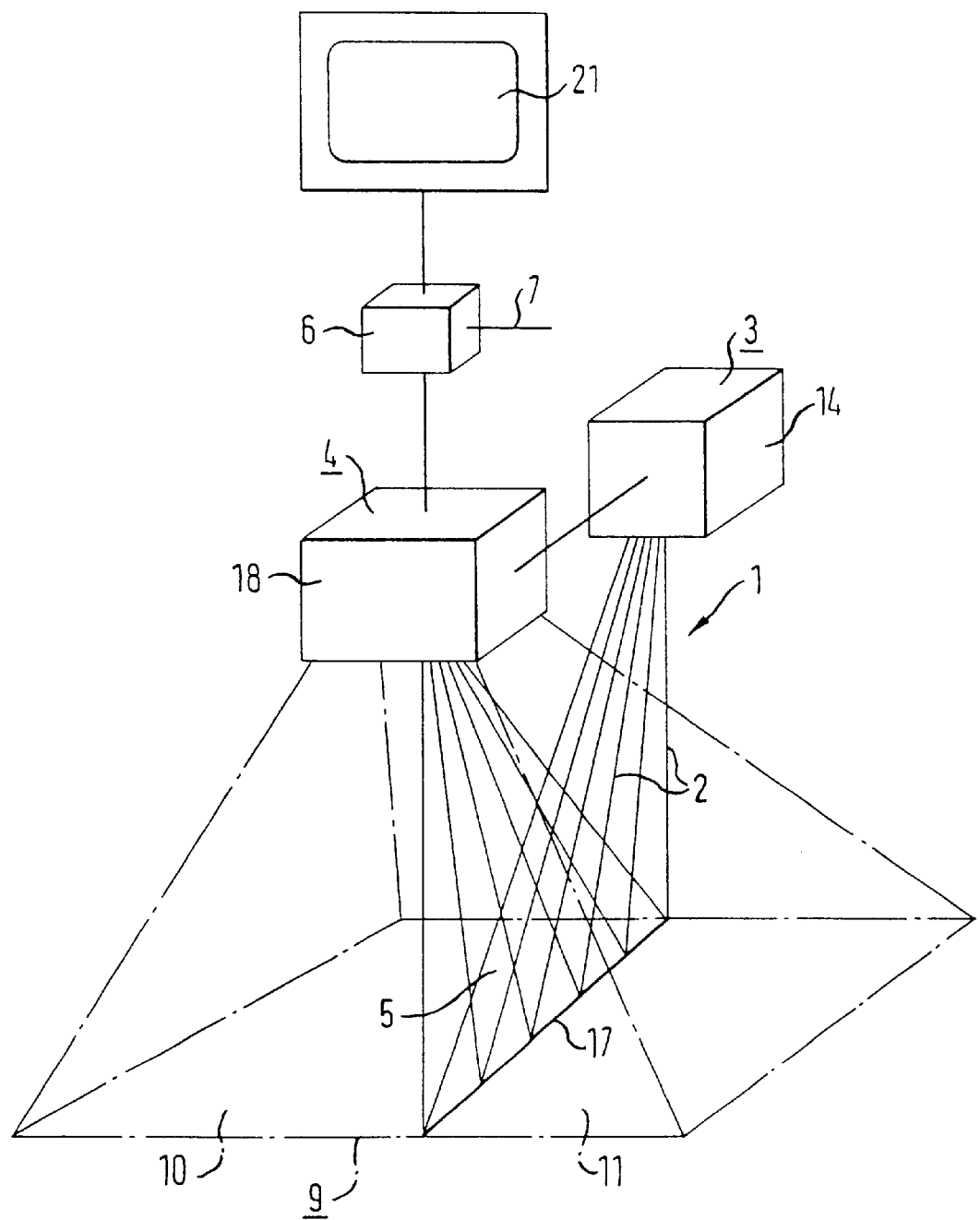
FIG. 5 shows a fifth embodiment of the invention.

In accordance with the embodiment of FIG. 5, the image detected by the image detection unit 18 is sent via the evaluation unit 6 to a display unit 21 and displayed there. The display unit 21 can be arranged, for example, in a monitoring center so that the cause of the infringement of the protection area 5 can be analyzed by an operator and the appropriate measures initiated. A decisive time saving can be made in this way, in particular in large production halls.

The remotely controlled restart of a machine after diagnosis from the monitoring center is, for example, possible with this embodiment.

| Reference numeral list |
| --- |
| 1 protection device which works in a non-contact manner |
| 2 light rays |
| 3 transmitter unit |
| 4 receiver unit |
| 5 protection area |
| 6 evaluation unit |
| 7 output |
| 8 image detection unit |
| 9 image detection area |
| 10 secondary monitoring area |
| 11 secondary monitoring area |
| 12 object |
| 13 arrow |
| 14 illumination unit or system |
| 15 image detection unit |
| 16 conveyor belt |
| 17 line |
| 18 image detection unit |
| 19 line |
| 20 light rays |
| 21 display unit |

What is claimed is:

1. An opto-electronic apparatus for the monitoring of a protection area comprising at least one protection device which works in a non-contact manner and which comprises an evaluation unit for the generation of an object detection signal on the intrusion of an object into the protection area, wherein an image detection unit is coupled to the protection device, which works in a non-contact manner, for the detection of an areal or spatial image detection area, with a secondary monitoring area disposed close to the protection area, but outside the protection area, being detectable by said image detection unit, and wherein the protection device which works in a non-contact manner, is controllable by the image detection unit and a classification of objects intruding into the secondary monitoring area can be carried out by the image detection unit.

2. An opto-electronic apparatus in accordance with claim 1, wherein the protection function of the protection device, which works in a non-contact manner, can be deactivated at least regionally and/or for a time on the detection of an object with pre-set characteristic features inside the secondary monitoring area.

3. An opto-electronic apparatus in accordance with claim 1, wherein a quality control of objects penetrating into the secondary monitoring area can be carried out by the image detection unit.

4. An opto-electronic apparatus in accordance with claim 1, wherein the protection device, which works in a non-contact manner, comprises at least one transmitter unit emitting light signals and at least one receiver unit receiving the emitted light signals directly or indirectly, and wherein the protection area is defined by the signal path of the emitted light signals.

5. An opto-electronic apparatus in accordance with claim 1, wherein the protection device, which works in a non-contact manner, is formed as a camera system.

6. An opto-electronic apparatus in accordance with claim 5, wherein the camera system comprises an active illumination unit.

7. An opto-electronic apparatus in accordance with claim 1, wherein the image detection unit is formed as a camera.

8. An opto-electronic apparatus in accordance with claim 1, wherein at least the secondary monitoring area can be displayed on a display unit.

9. An opto-electronic apparatus in accordance with claim 8, wherein the display unit comprises a screen.

10. An opto-electronic apparatus in accordance with claim 1, wherein the protection device, which works in a non-contact manner, is formed as a light grid or as a light scanner.

11. An opto-electronic apparatus in accordance with claim 1, wherein an illumination unit and the image detection unit are arranged in a common housing or in different housings.

12. An opto-electronic apparatus for the monitoring of a protection area comprising at least one protection device which includes an image detection unit for the detection of an areal or spatial image detection area and an evaluation unit for the generation of an object detection signal on the intrusion of an object into the protection area, wherein only a part of the image detection area forms the protection area and the remaining part of the image detection area forms a secondary monitoring area at least in part; wherein the evaluation unit is formed for the separate evaluation of the detected protection area and of the detected secondary monitoring area, and wherein a classification of objects intruding into the secondary monitoring area can be carried out by the image detection unit.

13. An opto-electronic apparatus in accordance with claim 12, wherein the protection function of the protection device, which works in a non-contact manner, can be deactivated at least regionally and/or for a time on the detection of an object with pre-set characteristic features inside the secondary monitoring area.

14. An opto-electronic apparatus in accordance with claim 12, wherein a quality control of objects penetrating into the secondary monitoring area can be carried out by the image detection unit.

15. An opto-electronic apparatus in accordance with claim 12, wherein the protection device, which works in a non-contact manner, comprises at least one transmitter unit emitting light signals and at least one receiver unit receiving the emitted light signals directly or indirectly and, wherein the protection area is defined by the signal path of the emitted light signals.

16. An opto-electronic apparatus in accordance with claim 12, wherein the protection device, which works in a non-contact manner, is formed as a camera system.

17. An opto-electronic apparatus in accordance with claim 12, wherein the image detection unit is formed as a camera.

18. An opto-electronic apparatus in accordance with claim 12, wherein at least the secondary monitoring area can be displayed on a display unit.

19. An opto-electronic apparatus in accordance with claim 12, wherein the protection device, which works in a non-contact manner, is formed as a light grid or as a light scanner.

20. An opto-electronic apparatus in accordance with claimed 12, wherein an illumination unit and the image detection unit are arranged in a common housing or in different housings.

* * * * *